United States Patent
Karabinis et al.

(10) Patent No.: US 12,028,793 B2
(45) Date of Patent: *Jul. 2, 2024

(54) SYSTEMS/METHODS OF ESTABLISHING A CAPABILITY, AND THEN USING THE CAPABILITY, TO PERFORM A FINANCIAL TRANSACTION BY A SMARTPHONE

(71) Applicant: Telcom Ventures LLC, Miami, FL (US)

(72) Inventors: Peter D. Karabinis, Cary, NC (US); Rajendra Singh, Indian Creek Village, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/539,020

(22) Filed: Dec. 13, 2023

(65) Prior Publication Data
US 2024/0114433 A1    Apr. 4, 2024

Related U.S. Application Data

(60) Continuation of application No. 18/450,517, filed on Aug. 16, 2023, which is a continuation of application (Continued)

(51) Int. Cl.
*H04W 48/04* (2009.01)
*G06Q 30/0601* (2023.01)
(Continued)

(52) U.S. Cl.
CPC ........ *H04W 48/04* (2013.01); *G06Q 30/0601* (2013.01); *H04L 67/52* (2022.05); (Continued)

(58) Field of Classification Search
CPC ....... H04W 4/029; H04W 4/80; H04W 4/023; H04W 48/04; H04W 88/06; H04L 67/52; G06Q 30/0601
(Continued)

(56) References Cited

U.S. PATENT DOCUMENTS 6,595,929 B2    7/2003    Stivoric et al.
6,769,607 B1    8/2004    Pitroda et al.
(Continued)

FOREIGN PATENT DOCUMENTS

WO    WO-2007109574 A2 *  9/2007    ........... G06Q 20/102

OTHER PUBLICATIONS

"Digital wallet" Wikipedia (4 pages) (Printed on Jul. 10, 2017).
(Continued)

*Primary Examiner* — William Nealon
(74) *Attorney, Agent, or Firm* — Carlson, Caspers, Vandenburgh & Lindquist, P.A.

(57) ABSTRACT

Systems/Methods are disclosed of establishing a capability at a smartphone to be able to conduct a financial transaction and then using the established capability in performing the financial transaction by paying for a product. According to some embodiments, said establishing is performed responsive to sensing a physiological parameter and determining that the physiological parameter sensed satisfies a criterion. Then, an authorization to establish said capability is requested and, responsive to receiving the authorization, the capability to be able to conduct the financial transaction is established at the smartphone. The capability that has been established may then be used in performing the financial transaction responsive to the smartphone sensing proximity to an access point maintained by a vendor and responsive to the physiological parameter being sensed and satisfying the criterion.

11 Claims, 3 Drawing Sheets

Related U.S. Application Data

No. 17/653,748, filed on Mar. 7, 2022, now Pat. No. 11,770,756, which is a continuation of application No. 15/929,609, filed on May 12, 2020, now Pat. No. 11,304,118, which is a continuation of application No. 16/012,513, filed on Jun. 19, 2018, now Pat. No. 10,660,015, which is a division of application No. 15/800,885, filed on Nov. 1, 2017, now Pat. No. 10,219,199, which is a continuation of application No. 15/251,882, filed on Aug. 30, 2016, now Pat. No. 9,832,708, which is a continuation of application No. 12/264,711, filed on Nov. 4, 2008, now Pat. No. 9,462,411.

(51) Int. Cl.
| | |
|---|---|
| H04L 67/52 | (2022.01) |
| H04W 4/02 | (2018.01) |
| H04W 4/029 | (2018.01) |
| H04W 4/80 | (2018.01) |
| H04W 76/10 | (2018.01) |
| H04W 88/06 | (2009.01) |

(52) U.S. Cl.
CPC ........... *H04W 4/023* (2013.01); *H04W 4/029* (2018.02); *H04W 4/80* (2018.02); *H04W 76/10* (2018.02); *H04W 88/06* (2013.01)

(58) Field of Classification Search
USPC ...................................... 455/456.3
See application file for complete search history.

(56) References Cited

U.S. PATENT DOCUMENTS

| | | | |
|---|---|---|---|
| 6,944,981 | B1 | 9/2005 | Garberg et al. |
| 6,957,107 | B2 | 10/2005 | Rogers et al. |
| 7,028,897 | B2 | 4/2006 | Fernandes et al. |
| 7,133,659 | B2 | 11/2006 | Zalewski et al. |
| 7,155,199 | B2 | 12/2006 | Zalewski et al. |
| 7,233,260 | B2 | 6/2007 | Tang et al. |
| RE39,736 | E | 7/2007 | Morrill, Jr. |
| 7,295,846 | B2 | 11/2007 | Daigremont et al. |
| 7,503,504 | B2 | 3/2009 | Mitra |
| 7,505,941 | B2 | 3/2009 | Bishop et al. |
| 7,539,241 | B1 | 5/2009 | Dick |
| 7,624,923 | B2 | 12/2009 | Clark et al. |
| 7,780,081 | B1 | 8/2010 | Liang |
| 7,822,644 | B2 | 10/2010 | Alberth, Jr. et al. |
| 7,912,629 | B2 | 3/2011 | Sutter et al. |
| 8,023,580 | B2 | 9/2011 | Bremer |
| 8,050,337 | B2 | 11/2011 | Karabinis |
| 8,091,780 | B2 | 1/2012 | Todd et al. |
| 8,249,935 | B1 | 8/2012 | DiMartino et al. |
| 8,463,238 | B2 | 6/2013 | Forstall et al. |
| 8,532,069 | B2 | 9/2013 | Balwani |
| 8,646,060 | B1 * | 2/2014 | Ben Ayed ............... H04W 4/20 |
| | | | 726/9 |
| 8,665,062 | B2 | 3/2014 | Bragagnini et al. |
| 8,965,281 | B2 | 2/2015 | Raisanen et al. |
| 2002/0170961 | A1 | 11/2002 | Dickson et al. |
| 2003/0172028 | A1 | 9/2003 | Abell et al. |
| 2003/0220105 | A1 | 11/2003 | Daigremont et al. |
| 2004/0030601 | A1 | 2/2004 | Pond et al. |
| 2004/0143505 | A1 | 7/2004 | Kovach |
| 2004/0143550 | A1 | 7/2004 | Creamer et al. |
| 2004/0170430 | A1 | 9/2004 | Gorokhov |
| 2005/0136949 | A1 | 6/2005 | Barnes |
| 2006/0009234 | A1 | 1/2006 | Freer |
| 2006/0085297 | A1 | 4/2006 | Minerley |
| 2006/0133633 | A1 | 6/2006 | Hyvonen et al. |
| 2006/0144933 | A1 | 7/2006 | Do et al. |
| 2006/0145893 | A1 * | 7/2006 | Hassett ................ G07B 15/063 |
| | | | 340/901 |
| 2006/0159260 | A1 | 7/2006 | Pereira et al. |
| 2006/0165060 | A1 * | 7/2006 | Dua ...................... G06Q 20/322 |
| | | | 705/76 |
| 2006/0172700 | A1 | 8/2006 | Wu |
| 2006/0194538 | A1 | 8/2006 | Palin et al. |
| 2007/0129077 | A1 | 6/2007 | Iguchi et al. |
| 2007/0167147 | A1 | 7/2007 | Krasner et al. |
| 2007/0178935 | A1 | 8/2007 | Shim et al. |
| 2007/0184837 | A1 | 8/2007 | Hohl et al. |
| 2007/0197261 | A1 * | 8/2007 | Humbel ............... H04L 63/0853 |
| | | | 455/558 |
| 2007/0198436 | A1 | 8/2007 | Weiss |
| 2007/0243872 | A1 | 10/2007 | Gallagher et al. |
| 2007/0250393 | A1 * | 10/2007 | Alberth ............... G06Q 30/0613 |
| | | | 705/26.41 |
| 2007/0260710 | A1 | 11/2007 | Dowling |
| 2007/0265984 | A1 | 11/2007 | Santhana |
| 2007/0285280 | A1 | 12/2007 | Robinson et al. |
| 2008/0040274 | A1 | 2/2008 | Uzo |
| 2008/0140667 | A1 | 6/2008 | LaBiche |
| 2008/0140868 | A1 | 6/2008 | Kalayjian et al. |
| 2008/0146148 | A1 | 6/2008 | Hulvey |
| 2008/0167966 | A1 | 7/2008 | Ramsdale et al. |
| 2008/0200166 | A1 | 8/2008 | McCamon |
| 2008/0227471 | A1 | 9/2008 | Dankar et al. |
| 2008/0306868 | A1 | 12/2008 | Robinson et al. |
| 2009/0023474 | A1 | 1/2009 | Luo et al. |
| 2009/0058637 | A1 | 3/2009 | Kuo et al. |
| 2009/0113543 | A1 | 4/2009 | Adams et al. |
| 2009/0153367 | A1 | 6/2009 | Lee |
| 2009/0169070 | A1 | 7/2009 | Fadell |
| 2009/0213947 | A1 | 8/2009 | Rao et al. |
| 2010/0067591 | A1 | 3/2010 | Luo et al. |
| 2010/0265845 | A1 | 10/2010 | Lampén |
| 2011/0314539 | A1 * | 12/2011 | Horton .................. H04W 12/30 |
| | | | 726/20 |
| 2012/0214443 | A1 | 8/2012 | Daigle |
| 2013/0156218 | A1 | 6/2013 | Annacone et al. |

OTHER PUBLICATIONS

"What Are Physiological Biometrics?" Thales, Mar. 2023, www.thalesgroup.com/en/markets/digital-identity-and-security/government/inspired/what-are-physiological-biometrics#:~:text=A%20fingerprint%20is%20an%20example,and%20characteristics%20of%20your%20body. Accessed Jun. 20, 2023.

Caen, the city where you pay and get information by taking out your cell phone. 01net.com. Oct. 20, 2005. Retrieved on Oct. 4, 2023 from https://www.01net.com/actualites/caen-la-ville-ou-lon-paye-et-sinforme-en-sortant-son-portable-292660.html.

Google search results, "when did apple introduce the fingerprint sensor on the iphone?", https://www.google.com/search?q=when+did+apple+introduce+the+fingerprint+sensor+on+the+iphone%3F&rlz=1C5CHFA_enUS1053US1053&oq=&aqs=chrome.0.69i59i45018.2238j0j15&sourceid=chrome&ie=UTF-8. Searched Oct. 17, 2023.

Google search results, "When was the first iphone released", https://www.google.com/search?q=when+was+the+first+iphone+released&rlz=1C5CHFA_enUS1053US1053&oq=&aqs=chrome.0.69i59i45018.11471j0j15&sourceid=chrome&ie=UTF-8#vhid=qRi4cJnW7gdnuM&vssid=l. Searched Oct. 17, 2023.

In Hanau, the mobile bus ticket is at the right price. 01net.com. May 2, 2005. Retrieved on Oct. 17, 2023 from https://www.01net.com/actualites/a-hanau-le-portable-ticket-de-bus-joue-au-juste-prix-276000.html.

International Search Report and Written Opinion of the International Searching Authority for corresponding PCT Application No. PCT/US09/062792 (8 pages) (Dec. 23, 2009).

J. Weatherbed, "10 years ago, Apple finally convinced US to lock our phones / Before Touch ID and fingerprint scanners, most of US couldn't be bothered to set a PIN or password to protect our mobile devices." The Verge. Sep. 12, 2023. Retrieved on Oct. 17, 2023 from https://www.theverge.com/23868464/apple-iphone-touch-id-fingerprint-security-ten-year-anniversary.

(56) References Cited

OTHER PUBLICATIONS

Telecoms—The contactless mobile revolution arrives in 2008. banquedesterritoires.fr. Dec. 21, 2007. Retrieved on Oct. 4, 2023 from https://www.banquedesterritoires.fr/la-revolution-mobile-sans-contact-arrive-en-2008.

U.S. Patent and Trademark Office, "Final Office Action", U.S. Appl. No. 15/929,609, Jun. 9, 2021, 17 pgs.

U.S. Patent and Trademark Office, "Final Rejection", U.S. Appl. No. 16/012,513, Dec. 11, 2018, pp. 1-10.

U.S. Patent and Trademark Office, "Final Rejection", U.S. Appl. No. 16/012,513, Dec. 19, 2019, pp. 1-14.

U.S. Patent and Trademark Office, "Final Rejection", U.S. Appl. No. 16/251,834, Dec. 17, 2019, pp. 1-14.

U.S. Patent and Trademark Office, "Non-Final Office Action", U.S. Appl. No. 17/653,748, Jun. 8, 2023, 19 pgs.

U.S. Patent and Trademark Office, "Non-Final Office Action", U.S. Appl. No. 18/489,517, Dec. 13, 2023, 7 pgs.

U.S. Patent and Trademark Office, "Notice of Allowance", U.S. Appl. No. 15/929,609, Dec. 9, 2021, 4 pgs.

U.S. Patent and Trademark Office, "Notice of Allowance", U.S. Appl. No. 16/012,513, Mar. 26, 2020, pp. 1-12.

U.S. Patent and Trademark Office, "Notice of Allowance", U.S. Appl. No. 16/251,834, Apr. 22, 2020, pp. 1-9.

U.S. Patent and Trademark Office, "Notice of Allowance", U.S. Appl. No. 17/653,748, Jul. 17, 2023, 9 pgs.

U.S. Patent and Trademark Office, "Office Action", U.S. Appl. No. 15/929,609, Jun. 9, 2021, 18 pgs.

U.S. Patent and Trademark Office, "Office Action", U.S. Appl. No. 15/929,609, Dec. 1, 2020, 16 pgs.

U.S. Patent and Trademark Office, "Office Action", U.S. Appl. No. 16/012,513, Apr. 12, 2019, pp. 1-11.

U.S. Patent and Trademark Office, "Office Action", U.S. Appl. No. 16/012,513, Jul. 31, 2018, pp. 1-8.

U.S. Patent and Trademark Office, "Office Action", U.S. Appl. No. 16/251,834, May 9, 2019, pp. 1-10.

U.S. Patent and Trademark Office, "Restriction Requirement", U.S. Appl. No. 18/489,517, Nov. 28, 2023, 8 pgs.

U.S. Patent and Trademark Office, "Supplemental Notice of Allowability", U.S. Appl. No. 17/653,748, Jul. 28, 2023, 4 pgs.

U.S. Patent and Trademark Office, "Notice of Allowance", U.S. Appl. No. 18/489,517, Jan. 12, 2024, 12 pgs.

U.S. Patent and Trademark Office, "Notice of Allowance", U.S. Appl. No. 18/523,863, Feb. 6, 2024, pp. 10.

* cited by examiner

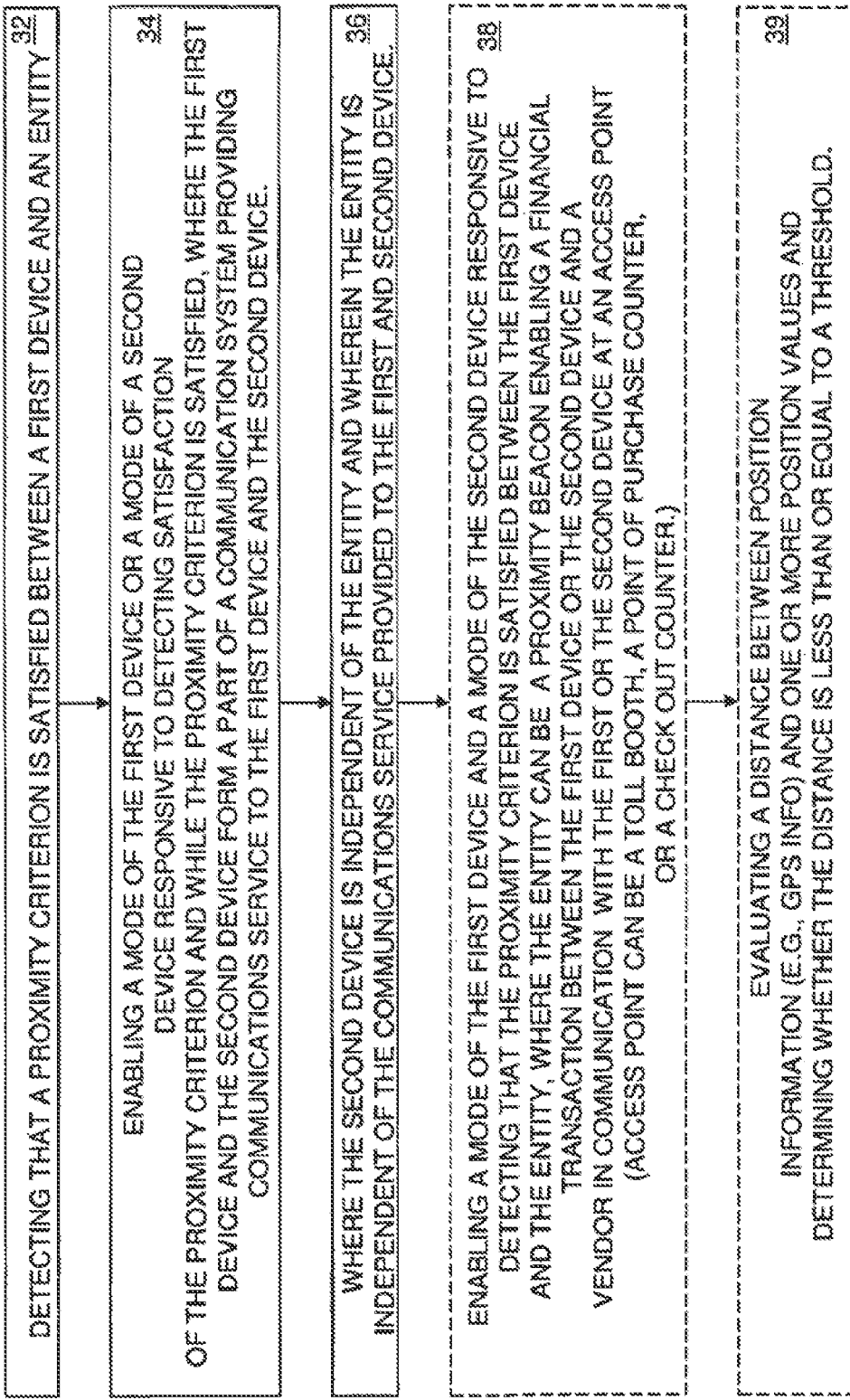

SYSTEMS/METHODS OF ESTABLISHING A CAPABILITY, AND THEN USING THE CAPABILITY, TO PERFORM A FINANCIAL TRANSACTION BY A SMARTPHONE

CROSS-REFERENCE TO RELATED APPLICATION

The present application is a continuation of U.S. application Ser. No. 18/450,517, filed Aug. 16, 2023, which is itself a continuation of U.S. application Ser. No. 17/653,748, filed Mar. 7, 2022, now U.S. Pat. No. 11,770,756, which is itself a continuation of U.S. application Ser. No. 15/929,609, filed May 12, 2020, now U.S. Pat. No. 11,304,118, which is itself a continuation of U.S. application Ser. No. 16/012,513, filed Jun. 19, 2018, now U.S. Pat. No. 10,660,015, which is itself a divisional of U.S. application Ser. No. 15/800,885, filed Nov. 1, 2017, now U.S. Pat. No. 10,219,199, which is itself a continuation of U.S. application Ser. No. 15/251,882, filed Aug. 30, 2016, now U.S. Pat. No. 9,832,708, which is itself a continuation of U.S. application Ser. No. 12/264,711, filed Nov. 4, 2008, now U.S. Pat. No. 9,462,411. The disclosures of which are hereby incorporated herein by reference as if set forth fully herein.

FIELD OF THE INVENTION

This invention relates to systems, devices and/or methods that may be used to provide an adaptive enablement of one or more communications modes based upon having satisfied a proximity criterion. The one or more communications modes may be one or more wireless and/or non-wireless communications modes.

BACKGROUND OF THE INVENTION

Adaptivity and mobility aspects of wireless communications are becoming more important in people's lives. People are relying more and more on mobile wireless devices to perform an ever-increasing suite of functions such as, for example, navigation, e-mail, web surfing, streaming video, etc. However, there is a rigidity aspect that is associated with wireless mobile devices in that a wireless mobile device is typically configured to be capable of performing a predetermined number of functions independent of its location, Time-of-Day (ToD), velocity, acceleration, temperature, sensing of a signal, etc. It would, for example, be desirable to have a mobile wireless device act as a "wallet" (over and above other functions) only when it is time to pay for an item and not act as a wallet when there is no need to do so.

The present invention, addresses these limitations (i.e., the rigidity) of current wireless mobile devices. Accordingly, embodiments of the present invention provide systems, devices and/or methods that may be used to enable adaptively one or more modes/functions of a device based upon having satisfied by the device (or another device) a proximity condition/criterion.

As used herein, the term "end-user device," "wireless mobile device," "mobile wireless device" or simply "device" includes any electronic device that may be used to transmit/receive information wirelessly and/or non-wirelessly such as, for example, a Digital Subscriber Line (DSL) modem/transceiver; a cable modem/transceiver; a cellular and/or satellite radiotelephone with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; laptop and/or palmtop computers or other appliances, which may (or may not) include a radio frequency transceiver.

An end-user device also may be referred to herein as a radiotelephone, radioterminal, mobile terminal, user device, wireless device, device and/or terminal; etc. As used herein, the term end-user device and/or any of its synonyms also include(s) any other radiating device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s).

BRIEF DESCRIPTION OF THE DRAWINGS

FIG. 3 is a flow chart illustrating a method of detecting proximity criterion and enabling functions or modes on devices in accordance with the claimed embodiments.

DETAILED DESCRIPTION

Figure 1:
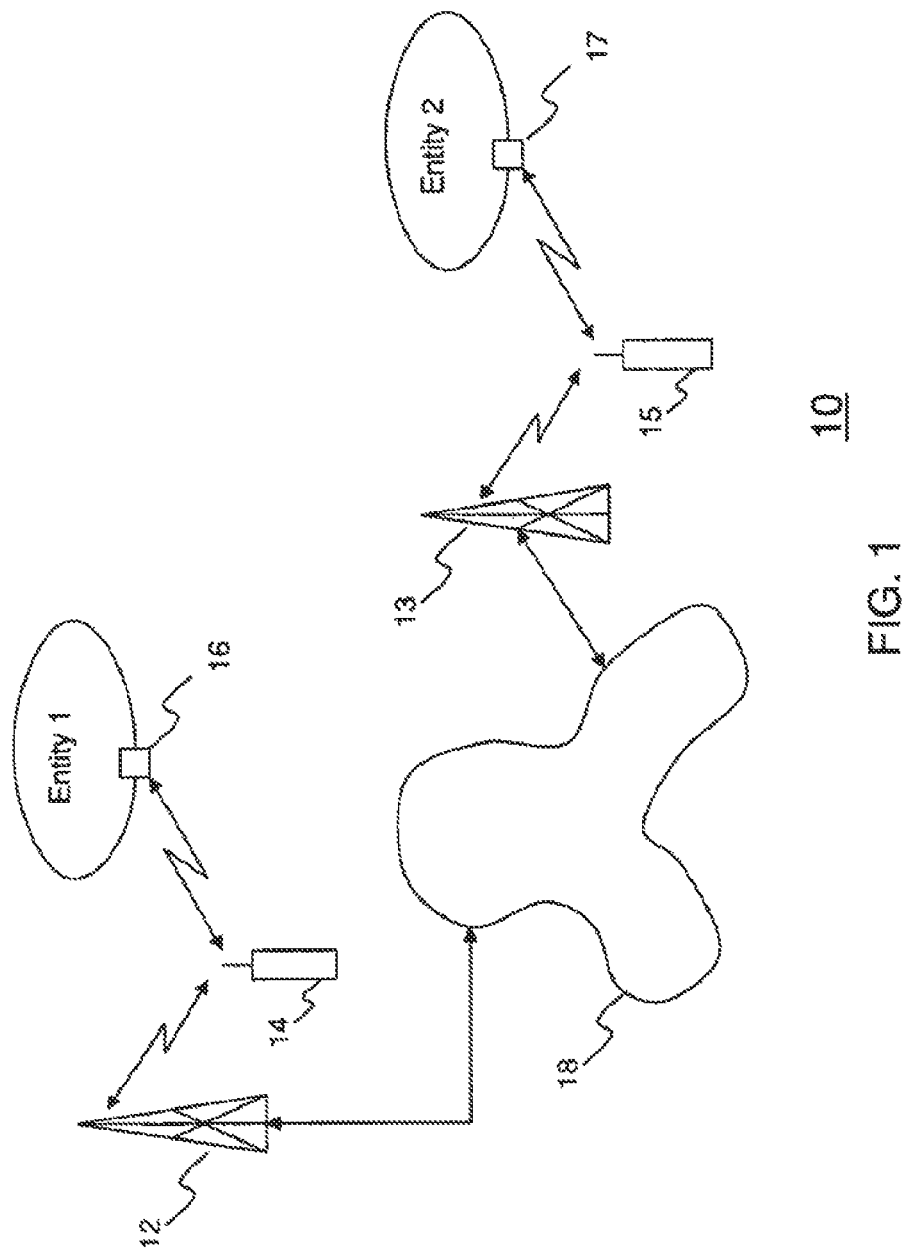
FIG. 1 depicts a communication system that detects a proximity criterion in accordance with the claimed embodiments.

The present invention now will be described more fully hereinafter with reference to specific embodiments and/or the accompanying drawing(s), in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected," "coupled" and/or "responsive" to another element, it can be directly connected, coupled and/or responsive to the other element or intervening elements may be present. Furthermore, "connected," "coupled" and/or "responsive" as used herein may include wirelessly connected, coupled and/or responsive. The terminology used herein is for the purpose of describing particular embodiments only and is not intended to be limiting of the invention. As used herein, the singular forms "a," "an" and/or "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Furthermore, it will be understood that although terms such as, for example, first and second may be used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "I" is also used as a shorthand notation for "and/or."

A mobile device such as, for example, a wireless communications device (e.g., a wireless terminal, a wireless/mobile phone, a Personal Digital Assistant (PDA), a smart phone, a multi-media device including Global Positioning System (GPS) capability, etc.) and/or one or more systems that is/are providing service to the mobile device and/or to a device other than the mobile device, may be configured to enable one or more modes/functions of the mobile device and/or of the device other than the mobile device, responsive to a proximity criterion having been satisfied.

In some embodiments, determining whether the proximity criterion is satisfied comprises determining by the mobile device and/or by the one or more systems of a location associated with the mobile device. In other embodiments, determining whether the proximity criterion is satisfied comprises determining by the device other than the mobile device and/or by the one or more systems of a location that is associated with the device other than the mobile device. The determining by the mobile device, by the device other than the mobile device and/or by the one or more systems may, in some embodiments, comprise reception and/or processing of GPS signals in order to determine a Time-of-Day (ToD), Time-of-Month (ToM), Time-of-Year (ToY), velocity, acceleration and/or position (in three-dimensional space). In other embodiments, the determining may be based upon the mobile device and/or the device other than the mobile device detecting a signal that is being radiated by a device that is attached to and/or is installed in/on an entity (i.e., a device that is associated with the entity). In still further embodiments, the device other than the mobile device may send a message to the mobile device requesting enablement of one or more modes/functions of the mobile device and/or of the device other than the mobile device and, responsive to an affirmative response by the mobile device, the mobile device and/or the device other than the mobile device may enable the one or more modes/functions of the mobile device and/or of the device other than the mobile device.

The entity may, for example, be a person, an animal, a vehicle (ground-based, maritime and/or aeronautical), a building (residential, commercial and/or office), a product that is for sale, a store that sells one or more products, a check-out counter in a store, a shopping cart that may be used by a customer to carry one or more products selected by the customer for purchase, one or more locations in time and/or space, a geographic area and/or a multi-dimensional region in time and/or space.

The signal that is being radiated by the device that is attached to and/or is installed in the entity may include an element that may be a priori known by the mobile device and/or by the device other than the mobile device. As such, according to some embodiments, the mobile device and/or the device other than the mobile device may, when proximate to the entity, receive the signal that is being radiated by the device that is attached to and/or is installed in the entity, detect the element that may be a priori known by the mobile device and/or by the device other than the mobile device and thus determine that the mobile device and/or the device other than the mobile device is proximate to the entity.

It will be understood that the signal that is being radiated by the device that is attached to and/or is installed in the entity may be radiated at a relatively low power level so that it may be detected by the mobile device and/or by the device other than the mobile device only over a relatively small distance between, for example, the mobile device and the device that is attached to and/or is installed in the entity (e.g., over a distance that is, for example, less than 100 meters, in some embodiments or less than 10 meters, in other embodiments). It will also be understood that the element that may be a priori known by the mobile device and/or by the device other than the mobile device may comprise an identity associated with the entity. In some embodiments, the identity may comprise a number, a word/name, a location, a Time-of-Day (ToD), a unique code, a region of space and/or time, etc.

According to some embodiments, the mobile device and/or the device other than the mobile device may be configured so that a user of the mobile device and/or a user of the device other than the mobile device, a service provider providing service to the mobile device and/or providing service to the device other than the mobile device and/or a manufacturer of the mobile device and/or the device other than the mobile device may program the mobile device and/or the device other than the mobile device to recognize the element and/or the identity associated with the entity.

A number of examples/applications of the concepts disclosed above will now be described to further illustrate the scope and spirit of the present invention to those skilled in the art.

Example/Application No. 1: A motor vehicle, such as, for example, a car, may be configured with a low-power radiator that radiates a signal that includes an identity of the motor vehicle, a velocity of the motor vehicle, an acceleration of the motor vehicle, a position of the motor vehicle, a Time-of-Day (ToD), a Time-of-Month (ToM), a Time-of-Year (ToY) and/or an indication of a content of the motor vehicle. Now imagine a person who is associated with the motor vehicle (e.g., an owner/driver of the motor vehicle) is approaching the motor vehicle. Let us assume that the person who is approaching the motor vehicle and is associated with the motor vehicle carries a wireless communications device. The wireless communications device may be configured to sense the signal that is being radiated by the low-power radiator, detect the identity of the motor vehicle and compare the detected identity with one or more a priori identities that are stored in the wireless communications device. If a match is found, the communications device may be configured to selectively enable, responsive to the match, for example, a "pay toll" function. Accordingly, as the motor vehicle approaches an access point that is configured to radiate a signal associated with toll collection, the communications device, responsive to having detected the signal associated with toll collection, may be configured to transmit information that may be used by the access point and/or by an associated toll collection system that may be connected to the access point to debit an account that is associated with a user and/or owner of the communications device. In further embodiments of the present invention, if the match is found, the communications device may be configured to selectively enable, responsive to the match and responsive to a velocity of the motor vehicle, an acceleration of the motor vehicle, a position of the motor vehicle, a Time-of-Day (ToD), a Time-of-Month (ToM), a Time-of-Year (ToY) and/or a content of the motor vehicle, for example, the "pay toll" function. It will be understood that the velocity of the motor vehicle, the acceleration of the motor vehicle, the position of the motor vehicle, the ToD, the ToM and/or the ToY may be provided by the communications device (based on GPS signal processing, and/or based on any other means, that may be performed/implemented by the communications device and/or by a network that may be providing service to the communications device) and/or by the motor vehicle.

The wireless communications device may be configured to keep the pay toll function enabled for as long as the wireless communications device is able to sense the signal that is being radiated by the low-power radiator (i.e., the signal that includes an identity of the motor vehicle) and to selectively disable the pay toll function a short time after the wireless communications device is no longer able to sense the signal that is being radiated by the low-power radiator. In further embodiments, the wireless communications device may be configured to keep the pay toll function enabled as long as the wireless communications device is able to sense the signal that is being radiated by the low-power radiator and a specific value (or values) associated with at least one of a velocity of the motor vehicle, an acceleration of the motor vehicle, a position of the motor vehicle, a ToD, a ToM, a ToY and a content of the motor vehicle is/are being met/satisfied.

In accordance with some embodiments, even though the wireless communications device does not find a match but is able to sense the signal that is being radiated by the low-power radiator, the wireless communications device may be configured to provide a notification (e.g., a sound, a vibration, a light and/or an alpha-numeric display, etc.). Responsive to the notification, a user of the wireless communications device may instruct (for example, manually or via voice command) the wireless communications device to enable the pay toll function.

In further embodiments, a second wireless communications device that belongs to and/or is being used by a second person, senses a signal and, responsive to having sensed the signal (whether a match is found or not) sends a request selectively to a first wireless communications device. Responsive to the request, the first wireless communications device sends an acknowledgement and/or an authorization to the second wireless communications device. Responsive to the acknowledgement and/or authorization the second wireless communications device selectively enables a mode which, according to some embodiments, is the pay toll function. It will be understood that the first and second wireless communications devices may, according to some embodiments, be predetermined to function as described above. That is, the first wireless communications device acting as a "master" and the second wireless communications device acting as a "slave" in that the second wireless communications device is configured to enable a mode/function thereof responsive to a detection/match and responsive to receiving an authorization from the first wireless communications device. If the mode/function comprises paying for a transaction, an amount of money associated with the paying may be deducted/withdrawn from an account associated with an owner/user of the first wireless communications device.

Thus, according to some embodiments, the first wireless communications device functions independently and/or autonomously whereas the second wireless communications device functions dependently on the first wireless communications device, at least as far as at least one of its modes/functions is concerned. The master-slave relationship between the first and second wireless communications devices may, according to some embodiments, be predetermined. In other embodiments, the master-slave relationship may not be predetermined and may be negotiated and/or established, as a need for such a relationship arises, by exchanging information between the first and second wireless communications devices. It will be understood that, in some embodiments, at least one of the first and second wireless communications devices may not be a wireless communications device.

Example/Application No. 2: A wireless communications device may be configured to estimate a location associated therewith and may also be configured to estimate a value of at least one other parameter that may be associated with the wireless communications device, an environment thereof and/or an entity (living or otherwise) that is associated with and/or is proximate to the wireless communications device. The "at least one other parameter" may, for example, be a velocity, acceleration, ToD, ToM, ToY, humidity, temperature, height, level of brightness, level of darkness, a blood pressure, a heart rate, a blood content, a physiological state, a psychological state, etc. As those skilled in the art will appreciate, the wireless communications device may be configured to estimate its location and the value of the "at least one other parameter" by, for example, processing GPS signals and/or by using other means and/or sensors that may, according to some embodiments, be device-based and/or network assisted/based means and/or sensors.

According to some embodiments, the wireless communications device may be configured to make a comparison between an estimate of its location and one or more other locations, that may be one or more other predetermined and/or pre-stored locations, and the wireless communications device may be configured to selectively enable a first communications mode/function responsive to an outcome of the comparison and/or to selectively disable a second communications mode/function responsive to the outcome of the comparison. In other embodiments, the wireless communications device may be configured to selectively enable the first communications mode/function responsive to the outcome of the comparison and/or responsive to a value of another parameter, such as, for example, a value associated with the "at least one other parameter" list and/or selectively disable the second communications mode/function responsive to the outcome of the comparison and/or responsive to a value of another parameter, such as, for example, a value associated with the "at least one other parameter" list.

For example, in some embodiments, if a comparison between an estimate of location of the wireless communications device and the one or more locations that are predetermined and/or pre-stored reveals a distance therebetween that is less than or equal to a threshold, the wireless communications device may be configured to selectively and/or preferentially enable a first communications mode, that may be one communications mode of a plurality of communications modes, that uses, for example, a first air interface protocol and a first set of frequencies to communicate information wirelessly (wherein the first set of frequencies may be a predetermined first set of frequencies), while refraining from using (and/or using only infrequently and/or as a last resort depending on an emergency, need and/or a priority) a second communications mode, of the plurality of communications modes, comprising a second set of frequencies and/or a second air interface protocol. In some embodiments, refraining from using (and/or using only infrequently and/or as a last resort depending on an emergency, need and/or a priority) a second communications mode comprises selectively and/or preferentially disabling the second communications mode that uses, for example, the second air interface protocol and/or the second set of frequencies. It will be understood that, according to some embodiments, the first and/or second air interface protocols may be predetermined and that the first and/or second set of frequencies may also be predetermined. In further embodiments, at least one of the first air interface protocol, the second air interface protocol, the first set of frequencies and the second set of frequencies may not be predetermined and may be determined as required responsive to receiving a message, sensing/detecting at least a portion of an electromagnet spectrum and/or via other means such as, for example, a user choice/preference/command.

In some embodiments, the first communications mode may comprise an air interface protocol, such as, for example, an Orthogonal Frequency Division Multiplexed and/or an Orthogonal Frequency Division Multiple Access (OFDM/OFDMA) protocol, a WiFi- and/or WiMAX-based air interface protocol that may be based upon Time Division Duplex (TDD) operation wherein a common set of frequencies are used bi-directionally (at different times) to provide uplink and downlink communications, and the first and/or second set of frequencies may comprise, for example, an unlicensed use and/or a licensed use set of frequencies.

In further embodiments, the wireless communications device may further be configured to selectively enable (or to prefer) a first communications mode and/or to selectively refrain from using (or avoid from using unless a level of priority and/or other reason is provided) a second communications mode, responsive to the comparison of position that was discussed earlier and/or responsive to a value of a quantity/parameter, such as, for example, a value associated with the "at least one other parameter" and/or responsive to an event (man-caused or natural). The first communications mode may comprise a first air interface protocol and a first set of frequencies for transmission/reception of information and the second communications mode may comprise a second air interface protocol, that may be different from the first air interface protocol, and/or a second set of frequencies for transmission and/or reception of information that may be different (or at least partially different) from the first set of frequencies.

The wireless communications device may be configured to repeatedly make a decision based on the comparison of position that was discussed earlier, based on the value of a quantity/parameter, such as, for example, a value associated with the "at least one other parameter" and/or based on the event (man-caused and/or natural), to maintain the first communications mode enabled and/or to maintain the second communications mode disabled for as long as the comparison of position, the value of the quantity/parameter and/or the event (man-caused and/or natural) continues to satisfy a threshold criterion and to disable the first communications mode and/or enable the second communications mode after the wireless communications device determines that the comparison of position, the value of the quantity/parameter and/or the event no longer satisfies the threshold criterion.

In further embodiments, responsive to the comparison of position, the value of the quantity/parameter and/or the event satisfying the threshold criterion, the wireless communications device may be configured to send information (automatically or upon user command) selectively to one or more other devices that, according to some embodiments, may be predetermined other devices. In still other embodiments, responsive to the comparison of position, the value of the quantity/parameter and/or the event satisfying the threshold criterion, the wireless communications device may be configured to receive information (automatically or upon user command) selectively from one or more other devices that, according to some embodiments, may be predetermined other devices.

Example/Application No. 3: A shopping cart, for example, of the type used in a grocery and/or super-market store, may be configured to sense/detect one or more items that are placed in the shopping cart. As used herein, the term "configured to sense/detect" may, in some embodiments, comprise sensing/detecting, for example, a weight, a manufacturer, an expiration date, a price and/or a nutritional value, etc. associated with the one or more items, wherein the sensing/detecting may be performed based upon any technology, such as, for example, a Radio Frequency (RF) tagging technology, a bar-code technology, an image recognition technology and/or any other technology.

Each shopping cart may include an identity (e.g., a number). Mr. Jones (a customer), who chooses a shopping cart having as identity a number such as, for example, "8787," may insert the number 8787 into a wireless communications device that Mr. Jones is carrying/using. Upon inserting the number 8787 into the wireless communications device, the wireless communications device may be configured to selectively establish a communications link, that may, in some embodiments, be a short-range communications link, with the shopping cart having identity 8787. From that time on, as the shopping cart senses/detects the one or more items that are placed in the shopping cart, information associated with the sensing/detecting of the one or more items, including price information associated with the one or more items, is transferred to Mr. Jones' wireless communications device via the communications link that is selectively established between Mr. Jones' wireless communications device and shopping cart 8787.

In the event that Mr. Jones decides to put back on a shelf an item that has been placed in shopping cart 8787, that item is sensed/detected by the shopping cart as having been withdrawn/deleted from the shopping cart and at least some information associated therewith is withdrawn/deleted, or at least changed, from Mr. Jones' wireless communications device via one or more commands/messages sent to the wireless communications device by the shopping cart, via the communications link.

When Mr. Jones has finished shopping, Mr. Jones can examine the wireless communications device and may instruct the wireless communications device to perform a transaction, such as, for example, to pay for the one or more items that Mr. Jones has placed in shopping cart 8787. In some embodiments, the shopping cart including the one or more items and the wireless communications device may need to be proximate to a specific location within the grocery and/or super market store (e.g., proximate to a "check-out" counter/location) before the wireless communications device and/or shopping cart (individually and/or jointly in communication therebetween) may enable a "pay" function by detecting a (short-range) signal that may be transmitted by/from the specific location.

Figure 2:
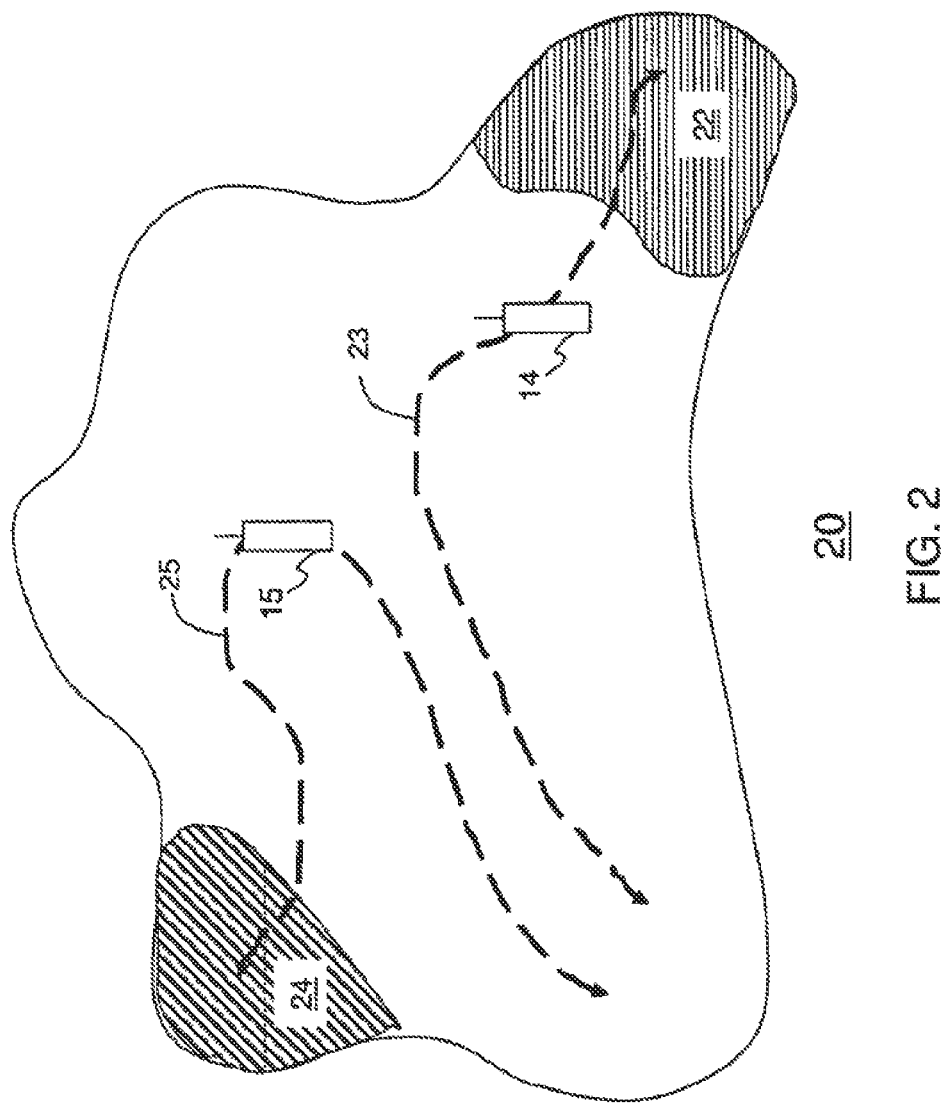
FIG. 2 depicts another communication system that detects a proximity criterion in accordance with the claimed embodiments.

Other Embodiments: FIGS. 1 and 2 illustrate further embodiments of the present invention. Additional embodiments may comprise systems and/or methods. For example, in one embodiment as illustrated in FIG. 1, a method in a system 10 is provided comprising: detecting that a proximity criterion is satisfied between a first device 14, such as a mobile subscriber device, and Entity 1; and enabling a mode of the first device and/or a mode of a second device 15 responsive to the detecting; where, according to some embodiments, the second device 15 is not the Entity 1 and is not associated with the Entity 1 and wherein the Entity 1 is not involved in providing a communications service to the first and/or second device. In one particular embodiment, a mobile subscriber device 14 linked to a communications system 18 via base station 12 can enable a function when the device 14 comes within a proximity of Entity 1. The function enabled can be any number of functions at the mobile subscriber device 14 or even at the mobile subscriber device 15. The mobile subscriber device 15 can also be linked to the communications system 18 via a base station 13. The function enabled can be a financial transaction, the transmission of communications, such as data, and/or some other function that may provision the mobile subscriber device 14 and/or the mobile subscriber device 15 with additional functionality not previously available/activated at the respective devices.

In one embodiment, the detection by mobile subscriber device 14 of a proximity criterion relative to Entity 1 can enable the mobile subscriber device 14 to authorize and complete a financial transaction such as the payment of a toll and/or of an item at a check out line. The same detection by mobile subscriber device 14 of the proximity criterion relative to Entity 1 can also or alternatively enable the mobile subscriber device 15 to authorize and complete a financial transaction such as the payment of a toll and/or a payment for an item at a check out line. The enablement of the mobile subscriber device 15 may also be contingent on the mobile subscriber device 15 having satisfied a proximity criterion relative to a second entity, such as Entity 2. Thus, the proximity criterion can include various requirements depending on the particular application. The requirements may include at least one of having the device 14 being within a predetermined distance of Entity 1, the device 14 receiving a predetermined signal strength from Entity 1, being at such predetermined distance for a predetermined time interval and receiving a predetermined signal strength during the predetermined time interval. The requirements can also include having device 15 being within a predetermined distance and/or predetermined signal strength of Entity 2, and/or being within such predetermined distance and/or signal strength during a predetermined time interval. It will be understood that at least one of devices 16 and 17, shown in FIG. 1 as being attached to Entity 1 and Entity 2, respectively, may, according to some embodiments, comprise a wireless transmitter and/or receiver.

According to some embodiments, the detecting may be performed by the first device (i.e., radioterminal 14), by the second device (i.e., radioterminal 15), by a device that is associated with an entity (i.e., device 16 and/or device 17) and/or by a system that is associated with the first and/or second devices (i.e., system 18, base station 12 and/or base station 13). Also, in some embodiments, the enabling may be performed by the first device, by the second device, by a device that is associated with the entity and/or by a system that is associated with the first and/or second devices.

In some embodiments, the first device comprises a wireless communications device, the second device comprises a wireless communications device and/or the system that is associated with the first and/or second devices comprises a wireless communications system that is configured to provide a communications service to the first and/or second devices.

In further embodiments, detecting comprises: using position information associated with the first device; using position information associated with the second device; detecting a signal (and/or a signal strength measurement such as RSSI) that is being radiated by the first device; detecting a signal (and/or a signal strength) that is being radiated by the second device; and/or detecting a signal (and/or a signal strength) that is being radiated by a device that is associated with the entity, wherein using position information may, according to some embodiments, comprise: evaluating a distance between the position information and one or more position values; and determining whether the distance is less than or equal to a threshold. In some embodiments, the one or more position values is/are predetermined.

In further embodiments, responsive to the enabling, the method comprises performing a function; wherein the function, according to some embodiments, comprises a financial transaction, receiving data and/or transmitting data. In some embodiments, receiving data comprises receiving data selectively from a first unit and wherein transmitting data comprises transmitting data selectively to a second unit. In some embodiments, the first and second units are the same unit, whereas in other embodiments the first and second units are different units. In further embodiments, the first and/or second units may be predetermined units and the first unit may comprise a wireless communications device and/or the second unit may comprise a wireless communications device. In yet further embodiments, the first unit may be associated with an Internet Protocol (IP) address and/or the second unit may be associated with an IP address.

Referring to FIG. 2, the first device 14 can traverse a path 23 within an overall coverage area 20 and the second device 15 can traverse a path 25 within the overall coverage area 20. The overall coverage area 20 can include areas 22 and 24 that can be associated with respective entities. The entry of the first device 14 within area 22 can selectively enable a mode and/or a function at device 14 and can optionally enable a mode and/or a function at device 15 based, according to some embodiments, on a proximity criterion to area 24. For example, if device 14 owned and/or operated by a user is at a first store within area 22 and the device 15 owned/operated by, for example, the user's spouse is at a second store within area 24, then the user's spouse at device 15 can complete a purchase within area 24 based on the user's presence with device 14 within area 22. Similarly, if the two users at devices 14 and 15 at respective areas 22 and 24 want to sample music, games and/or even play a game between each other, their respective device can be provisioned for such sampling as long as they stay within the proximity criteria set for each of the respective devices. Once one or the other device goes beyond the respective proximity criterion, the mode and/or function enabling the sampling will be disabled at one or both devices.

In some embodiments according to the present invention, receiving data comprises receiving a position, a request and/or an acknowledgement and wherein transmitting data comprises transmitting a position, an authorization and/or an acknowledgement.

In further embodiments according to the present invention, the financial transaction comprises providing payment associated with a toll and/or providing payment associated with a purchase of one or more items.

In accordance with additional embodiments of the present invention, receiving data comprises receiving data once or repeatedly and transmitting data comprises transmitting data once or repeatedly.

It will be understood that relative to any one of the plurality of methods described above, the term "entity" may comprise a person, an animal, a building, a motor vehicle, a shopping cart, a product, a check-out counter, a geographic position, a geographic area and/or one or more locations in time and/or space.

In a further embodiment according to the present invention, a system is provided comprising: a detector that is configured to enable a mode of a first device and/or to enable a mode of a second device responsive to a detection that a proximity criterion is satisfied between the first device and an entity; wherein, according to some embodiments, the second device is not the entity and is not associated with the entity, and wherein, according to further embodiments, the entity is not involved in providing a communications service to the first and/or second device. In some embodiments, the detector is included in, and the detection is performed by, the first device, the second device, a device that is associated with the entity and/or a system that is associated with the first and/or second devices. Similarly, according to some embodiments, the detector is included in, and the mode is enabled by, the first device, the second device, a device that is associated with the entity and/or a system that is associated with the first and/or second devices.

Referring to FIG. 3, a flow chart illustrating a method 30 in accordance with an embodiment herein includes detecting that a proximity criterion is satisfied between a first device and an entity at 32. Note, that although the steps described are in a certain order in this embodiment, embodiments contemplated within the scope of the claims are not necessarily limited to a particular order or necessarily include every step described in method 30 and may further include additional steps as may be obvious to one of ordinarily skilled in the art. Method 30 can further include enabling a mode of the first device and/or a mode of a second device responsive to detecting satisfaction of the proximity criterion and while the proximity criterion is satisfied at 34, where the first device and the second device form a part of a communication system providing communications service to the first device and the second device. The second device can be independent of the entity and the entity can be independent of the communications service provided to the first and second device at shown at 36. The method at 38 can enable a mode of the first device and a mode of the second device responsive to detecting that the proximity criterion is satisfied between the first device and the entity. The first device and the second device can be mobile subscriber devices (i.e., radioterminals) and the entity can be a proximity beacon enabling a financial transaction between the first device or the second device and a vendor in communication with the first device or the second device at an access point maintained by the vendor or on behalf of the vendor. The access point can be a toll both, a point of purchase counter, or a check out counter and the first device and the second device can be cellular phones authorized selectively by its user and by satisfying the proximity criterion to proceed with a financial transaction associated with the vendor at the access point. As previously noted, although cellular phones are described, other communication devices are certainly within contemplation of the scope of the claims. The step of detecting can be done in any number of various ways. Detecting can include using position information associated with the first device relative to the entity or using position information of the second device relative to the entity or detecting a signal being radiated by the entity or detecting a signal being radiating by the first device and reflected by the entity or detecting a signal being radiating by the second device and reflected by the entity. In this regard, the method 30 can further evaluate a distance between the position information and one or more position values and determine whether the distance is less than or equal to a threshold at 39.

In some embodiments, the first device comprises a wireless communications device and/or the second device comprises a wireless communications device and the system that is associated with the first and/or second devices comprises a wireless communications system.

In further embodiments, the detection comprises: use of position information associated with the first device; use of position information associated with the second device; a detection of a signal that is being radiated by the first device; a detection of a signal that is being radiated by the second device; and/or a detection of a signal that is being radiated by a device that is associated with the entity. In some embodiments, use of position information comprises: an evaluation of a distance between the position information and one or more position values; and a determination of whether the distance is less than or equal to a threshold. It will be understood, that according to some embodiments of the invention, the one or more position values may be predetermined position values.

In yet additional embodiments of the present invention, the first device and/or the second device may be configured to perform a function responsive to the mode having been enabled by the detector, wherein, according to some embodiments, the function may comprise a financial transaction, reception of data and/or transmission of data. In some embodiments, reception of data comprises reception of data selectively from a first unit and transmission of data comprises transmission of data selectively to a second unit. In accordance with some embodiments, the first and second units are the same unit and in accordance with other embodiments, the first and second units are different units. It will be understood that in some embodiments the first and/or second units may be first and second predetermined units.

In yet further embodiments of the invention, the first unit may comprise a wireless communications device and/or the second unit may comprise a wireless communications device. According to additional embodiments, the first unit is associated with an Internet Protocol (IP) address and/or the second unit is associated with an IP address.

In some embodiments of the present invention, receiving data comprises receiving a position, a request and/or an acknowledgement and wherein transmitting data comprises transmitting a position, an authorization and/or an acknowledgement. According to other embodiments, the financial transaction comprises a payment of a toll and/or a payment associated with a purchase of one or more items. It will be understood that, in some embodiments, the reception of data comprises reception of data once or repeatedly and that, according to some embodiments, the transmission of data comprises transmission of data once or repeatedly. It will also be understood that according with any one of the embodiments described above (or any combination thereof) the term "entity," as used therein may comprise a person, an animal, a building, a motor vehicle, a shopping cart, a product that is on sale, a check-out counter, a geographic position, a geographic area and/or one or more locations in time and/or space.

In some embodiments according to the present invention, a system may comprise the detector, the first device, the second device, the entity, the device that is associated with the entity and/or the system that is associated with the first and/or second devices.

In the specification, there have been disclosed embodiments and, although specific terms are employed, they are used in a generic and descriptive sense only and not for purposes of limitation. The following claims are provided to set forth, at least in part, the scope of the present invention.

The invention claimed is:

1. A method comprising:
sensing a physiological parameter; then
determining whether or not the physiological parameter sensed satisfies a criterion; then
responsive to the physiological parameter sensed satisfying the criterion, enabling at least one first function; then
while said at least one first function is enabled, responsive to having sensed the physiological parameter and responsive to having determined that the physiological parameter sensed satisfies the criterion, requesting an authorization to establish a function to conduct a financial transaction; then
responsive to the requesting, receiving the authorization to establish the function to conduct the financial transaction; then
responsive to receiving the authorization, establishing the function to conduct the financial transaction; and then
responsive to satisfying a proximity condition relative to an entity and responsive to sensing the physiological parameter and determining that the physiological parameter sensed satisfies the criterion, using the function that has been established to conduct the financial transaction and conducting the financial transaction by paying for a product;
wherein said paying for a product comprises sensing that the proximity condition is satisfied relative to an access point maintained by a vendor at a point of purchase counter, by detecting a short-range signal that is transmitted by the access point, determining that the physiological parameter sensed satisfies the criterion and then, responsive to having sensed that the proximity condition is satisfied relative to the access point and having determined that the physiological parameter sensed satisfies the criterion, paying for the product by selectively sending information to at least one device;
wherein said paying for the product by selectively sending information to at least one device comprises selectively and wirelessly transmitting information to the at least one device using unlicensed frequencies; and
wherein said paying for a product further comprises deducting/withdrawing an amount of money from an account.

2. The method of claim 1, wherein said enabling at least one first function comprises enabling the at least one first function and disabling a second function; and wherein the method further comprises:
repeatedly sensing the physiological parameter and repeatedly deciding, based on comparing the physiological parameter sensed to the criterion, whether or not to maintain enabled said at least one first function while maintaining disabled said second function; and
maintaining enabled said at least one first function while maintaining disabled said second function responsive to deciding that the physiological parameter sensed satisfies the criterion; or
disabling said at least one first function and enabling said second function responsive to deciding that the physiological parameter sensed no longer satisfies the criterion.

3. The method of claim 1, wherein said paying for a product further comprises wirelessly receiving information from at least one device using unlicensed frequencies.

4. The method of claim 3,
wherein said wirelessly transmitting information to the at least one device using unlicensed frequencies and said wirelessly receiving information from at least one device using unlicensed frequencies comprises using unlicensed frequencies over a short-range link in a Time Division Duplex operation; and
wherein said selectively and wirelessly transmitting information to the at least one device further comprises selectively and wirelessly transmitting information to the access point maintained by the vendor at the point of purchase counter and to at least one other device that is predetermined; and further comprises wirelessly receiving information from the access point maintained by the vendor at the point of purchase counter and from at least one other device that is predetermined.

5. A wireless device that comprises a smartphone and a sensor; wherein the wireless device is configured to perform operations comprising:
sensing, by the sensor, a physiological parameter of a user of the wireless device; then
determining whether or not the physiological parameter sensed satisfies a criterion; then
responsive to the physiological parameter sensed satisfying the criterion, enabling at least one first function of the wireless device; then
while said at least one function is enabled, responsive to having sensed the physiological parameter and responsive to having determined that the physiological parameter sensed satisfies the criterion, requesting from a second device an authorization to establish a function to conduct a financial transaction; then
responsive to the requesting, receiving from the second device the authorization to establish the function to conduct the financial transaction; then
responsive to receiving the authorization, establishing at the wireless device the function to conduct the financial transaction; and then
responsive to the wireless device satisfying a proximity condition relative to an entity and responsive to the wireless device sensing the physiological parameter and determining that the physiological parameter sensed satisfies the criterion, using the function that has been established at the wireless device to conduct the financial transaction and conducting the financial transaction by paying for a product;
wherein said paying for a product comprises sensing that the proximity condition is satisfied relative to an access point maintained by a vendor at a point of purchase counter, by detecting a short-range signal that is transmitted by the access point, determining that the physiological parameter sensed satisfies the criterion and then, responsive to having sensed that the proximity condition is satisfied relative to the access point and having determined that the physiological parameter sensed satisfies the criterion, paying for the product by selectively sending information to at least one device;
wherein said paying for the product by selectively sending information to at least one device comprises selectively and wirelessly transmitting information to the at least one device using unlicensed frequencies; and wherein said paying for a product further comprises deducting/withdrawing an amount of money from an account.

6. The wireless device of claim 5, wherein said enabling at least one first function of the wireless device comprises enabling the at least one first function of the wireless device and disabling a second function of the wireless device; and wherein the operations further comprise:

repeatedly sensing the physiological parameter and repeatedly deciding, based on comparing the physiological parameter sensed to the criterion, whether or not to maintain enabled said at least one first function while maintaining disabled said second function; and maintaining enabled said at least one first function while maintaining disabled said second function responsive to deciding that the physiological parameter sensed satisfies the criterion; or disabling said at least one first function and enabling said second function responsive to deciding that the physiological parameter sensed no longer satisfies the criterion.

7. The wireless device of claim 5, wherein said conducting the financial transaction by paying for a product comprises:

establishing by the wireless device a short-range wireless link with the entity;

wirelessly transmitting information to the entity using unlicensed frequencies; and wirelessly receiving information from the entity using unlicensed frequencies;

wherein said wirelessly transmitting information to the entity and said wirelessly receiving information from the entity comprises using unlicensed frequencies in a time division duplex operation; and wherein said establishing by the wireless device a short-range wireless link with the entity comprises establishing the short-range wireless link with the entity responsive to the wireless device satisfying the proximity condition relative to the entity and responsive to the wireless device sensing the physiological parameter and determining that the physiological parameter sensed satisfies the criterion.

8. The wireless device of claim 5, wherein said requesting from a second device an authorization to establish a function to conduct a financial transaction and/or said receiving from the second device the authorization to establish the function to conduct the financial transaction comprises:

establishing by the wireless device a link with the second device, said link comprising a wireless link;

wirelessly transmitting information to the second device over said wireless link using unlicensed and/or licensed frequencies; and wirelessly receiving information from the second device over said wireless link using unlicensed and/or licensed frequencies;

wherein said wirelessly transmitting information to the second device and/or said wirelessly receiving information from the second device comprises using a WiFi air interface protocol, an orthogonal frequency division multiplexing air interface protocol and/or an orthogonal frequency division multiple access air interface protocol; and wherein said establishing by the wireless device a link with the second device comprises establishing the link with the second device responsive to the wireless device sensing the physiological parameter and determining that the physiological parameter sensed satisfies the criterion.

9. The wireless device of claim 5, wherein said using unlicensed frequencies comprises using unlicensed frequencies over a short-range link in a Time Division Duplex operation; and wherein said selectively sending information to at least one device further comprises selectively sending information to the access point maintained by the vendor at the point of purchase counter and to at least one other device that is predetermined; and selectively receiving information from the access point maintained by the vendor at the point of purchase counter and from at least one other device that is predetermined.

10. The wireless device of claim 5, wherein said paying for a product further comprises wirelessly receiving information from at least one device using unlicensed frequencies.

11. The wireless device of claim 10, wherein said wirelessly transmitting information to the at least one device using unlicensed frequencies and said wirelessly receiving information from at least one device using unlicensed frequencies comprises using unlicensed frequencies over a short-range link in a Time Division Duplex operation; and wherein said selectively and wirelessly transmitting information to the at least one device further comprises selectively and wirelessly transmitting information to the access point maintained by the vendor at the point of purchase counter and to at least one other device that is predetermined; and further comprises wirelessly receiving information from the access point maintained by the vendor at the point of purchase counter and from at least one other device that is predetermined.

* * * * *